US007798561B2

(12) United States Patent
Knobel et al.

(10) Patent No.: US 7,798,561 B2
(45) Date of Patent: Sep. 21, 2010

(54) FUEL PUMP ASSEMBLY ACCESS PANEL

(76) Inventors: Lawrence F. Knobel, 1191 Winnipeg Ct., Henderson, NV (US) 89015-8599; Kathryn Knobel, 1191 Winnipeg Ct., Henderson, NV (US) 89015-8599

( * ) Notice: Subject to any disclaimer, the term of this patent is extended or adjusted under 35 U.S.C. 154(b) by 647 days.

(21) Appl. No.: 11/796,476

(22) Filed: Apr. 27, 2007

(65) Prior Publication Data

US 2008/0264583 A1 Oct. 30, 2008

(51) Int. Cl.
*B60R 13/01* (2006.01)

(52) U.S. Cl. .................................................... 296/191

(58) Field of Classification Search ................. 296/191; 160/368.1; 29/700

See application file for complete search history.

(56) References Cited

U.S. PATENT DOCUMENTS 3,364,869 A * 1/1968 Toschkoff .................. 417/540
3,396,712 A * 8/1968 Sakraida et al.
3,869,859 A * 3/1975 Thornburgh
4,027,644 A * 6/1977 Timour
5,456,514 A * 10/1995 Justice ...................... 296/39.2
6,435,365 B2 * 8/2002 Pachciarz et al. .......... 220/4.14
6,533,288 B1 * 3/2003 Brandner et al. ............ 277/630
7,341,047 B2 * 3/2008 Sone et al. .................. 123/509
2007/0063547 A1 * 3/2007 Gollehur et al. ........ 296/193.07
2008/0000703 A1 * 1/2008 Shindou .................... 180/68.5
2009/0260602 A1 * 10/2009 Kim .......................... 123/519

* cited by examiner

*Primary Examiner*—H Gutman
(74) *Attorney, Agent, or Firm*—Raymond M. Galasso; Galasso & Associates, L.P.

(57) ABSTRACT

Fuel Pump Assembly Access Panel is an easily removable panel that offers access to a fuel tank and fuel pump and allows work on these components to be done from above the car or other vehicle. The preferred embodiment of Fuel Pump Assembly Access Panel is comprised of an access panel and six screw holes around the perimeter of the access panel for use with a pick-up truck. To use the preferred embodiment of Fuel Pump Assembly Access Panel, an individual would install the access panel using the appropriate number of screws. The access panel would cover an opening over the fuel tank and fuel pump area. When access to the fuel pump was required, the screws would be taken out, and the access panel would be removed. The necessary work would be performed, and the access panel would then simply be screwed back into place.

8 Claims, 2 Drawing Sheets

FUEL PUMP ASSEMBLY ACCESS PANEL

CROSS REFERENCE TO RELATED APPLICATIONS

This United States Non-Provisional Patent Application does not claim priority to any United States Provisional Patent Application or any foreign patent application.

FIELD OF THE DISCLOSURE

The disclosures made herein relate generally to the automotive industry. The invention discussed herein is in the general classification of access panels for repair and replacement of fuel pumps.

BACKGROUND

The electric fuel pump is the heart of an electronic fuel injection system. In most vehicles, the fuel pump is located either inside of, or very close to, the fuel tank. There are two main functions of the fuel pump: pushing fuel from the tank to the injectors and creating sufficient pressure to allow the injectors to deliver the correct amount of fuel under various operating conditions. A weak or failing fuel pump will result, in emissions problems, as well as affect the performance and drivability of a vehicle.

Because electric fuel pumps operate for the entire time a car or other motorized vehicle is running, they are prone to eventual failure. Fuel pump wear can be accelerated by the introduction of a contaminant or debris into the fuel pump that can jam the mechanism and cause the motor to overheat and ultimately fail. Replacing the fuel pump can be a challenging and time consuming process for a vehicle owner. As a result, many vehicle owners make an expensive visit to the mechanic when a fuel pump must be repaired or replaced.

Most fuel pump repairs require a mechanic to use a hydraulic lift or jack to raise the vehicle to allow work to be done from the underside of the vehicle. The fuel tank often must be emptied prior to any fuel pump repairs. Truck liners can also be damaged during a fuel pump replacement or repair on trucks. No device is currently available to allow easy access to a vehicle's fuel pump from above the vehicle.

Hence, there is a need in the art for a convenient to use, inexpensive, durable, safe and effective device for allowing easy access to fuel pumps in a variety of motorized vehicles.

SUMMARY OF THE DISCLOSURE

Fuel Pump Assembly Access Panel is an easily removable panel that offers access to a fuel tank and fuel pump while allowing work on these components to be done from above the car, truck or other vehicle.

The preferred embodiment of the invention is an access panel for use with a pick-up truck.

Other embodiments of the invention are for use with different types of motorized vehicles. In some embodiments, the access panel will be located under car seats, in the floor of trunks or in other similar locations. Other embodiments of the invention may utilize a varying number of screws and gaskets.

The principal object of this invention is to provide a device to cover an opening over a fuel pump and fuel tank in a motorized vehicle.

Another object of this invention is to provide a device to allow a user to replace or repair a fuel pump from above the motorized vehicle.

Another object of this invention is to provide a device to allow a user to repair or replace a fuel pump without having to use a jack or hydraulic lift.

Another object of this invention is to provide a device to allow a user to repair or replace a fuel pump without having to empty the fuel tank.

Another object of this invention is to provide a device to allow a user to repair or replace a fuel pump without damaging a truck bed liner.

Another object of this invention is to provide an affordable device to allow a user to repair or replace a fuel pump.

Another object of this invention is to provide a safe device to allow a user to repair or replace a fuel pump.

Yet another object of this invention is to provide a durable device to allow a user to repair or replace a fuel pump.

DETAILED DESCRIPTION OF THE DRAWINGS

The preferred embodiment of Fuel Pump Assembly Access Panel is comprised of at least some of the following: an access panel and six screw holes around the perimeter of the access panel for use with a pick-up truck.

Figure 1:
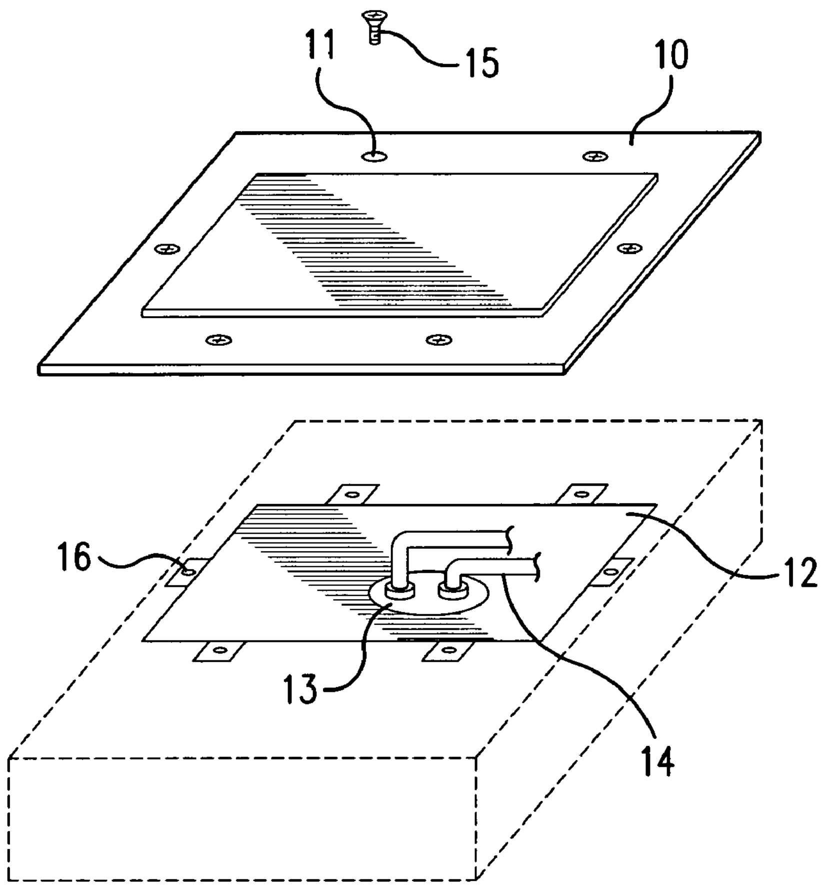
FIG. 1 depicts a perspective view of the preferred embodiment of the access panel removed from a pick-up truck bed over a fuel pump opening.

FIG. 1 depicts a perspective view of the preferred embodiment of the access panel removed from a pick-up truck bed over a fuel pump opening. The access panel 10 is approximately rectangular and has six screws holes 11 evenly spaced around the perimeter. There are two screw holes on each side and one screw hole on each end of the access panel 10. Though the size of the access panel 10 may vary widely to accommodate different size fuel pump openings, it is one foot wide, two feet long and a sixteenth of an inch thick in this preferred embodiment and made of the same material as the pick-up truck bed. In the preferred embodiment shown, the access panel 10 is slightly raised in the center compared to the perimeter containing the six screw holes 11.

The access panel 10 is designed to cover an opening 12 in the pick-up truck bed over the fuel pump 13 and connecting hoses 14 of the pick-up. Screws 15 are used to attach the access panel 10 to the pick-up truck bed. The pick-up truck bed has holes 16 dimensioned and spaced to accept the screws 15 permeating through the screw holes 11.

Figure 2:
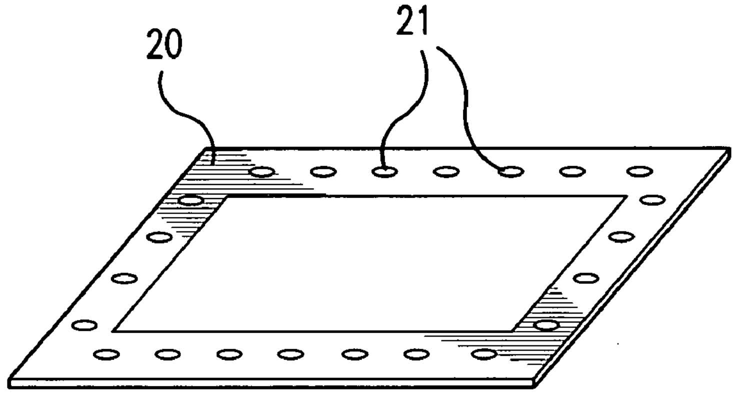
FIG. 2 depicts a perspective view of the preferred embodiment of the monolithic gasket for use with the access panel.

FIG. 2 depicts a perspective view of the preferred embodiment of the monolithic gasket for use with the access panel. A monolithic gasket 20 is located underneath the access panel to provide a fire proof and safety seal in case of a fire or explosion in an accident. The monolithic gasket 20 conforms to the contour and shape of the connecting surfaces of the access panel and pick-up truck bed and is ideally designed to attach along the bottom perimeter of the access panel. A plethora of holes 21 are spaced along the monolithic gasket 20 to allow the screws permeating through the screw holes of the access panel to penetrate the gasket 20 at whatever location necessary to attach to the holes in the pick-up truck bed.

Figure 3:
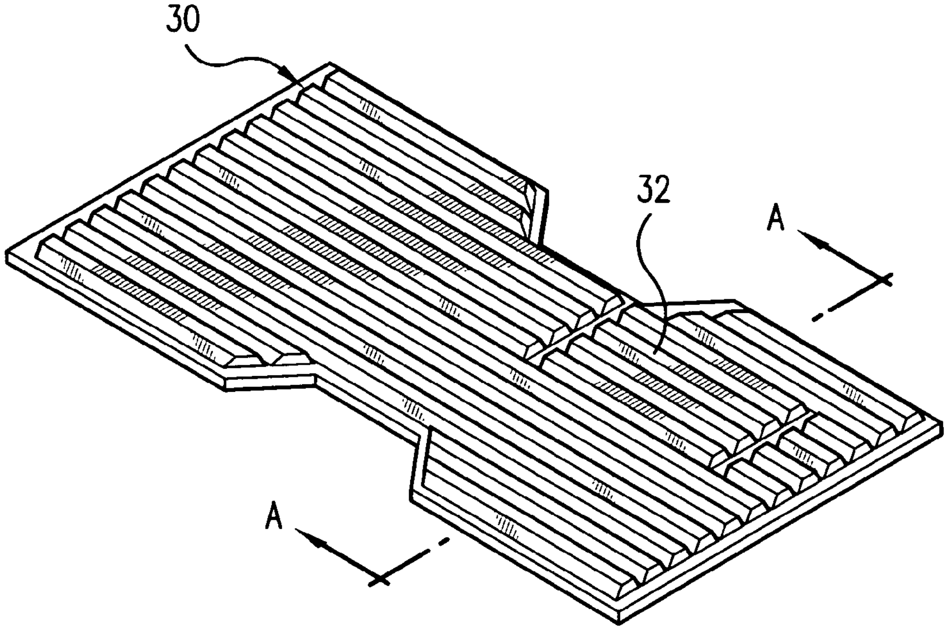
FIG. 3 depicts a perspective view of the bottom portion of a standard pick-up truck bed liner with the preferred embodiment of the pick-up truck bed liner access panel installed.

FIG. 3 depicts a perspective view of the bottom portion of a standard pick-up truck bed liner with the preferred embodiment of the pick-up truck bed liner access panel installed. Pick-up truck bed liners accommodate the standard configuration of a pick-up truck bed. The exact size of the bottom of the bed liner 30 will vary and is not critical to the present invention. The bed liner access panel 32 is shown installed on the bed liner 30 approximately at the front and toward one side of the bottom of the bed liner 30. The bed liner access panel 32 is located above the access panel described in conjunction with FIG. 1 and permits a user to reach that access panel without damaging or removing the bed liner of a pick-up truck.

Figure 4:
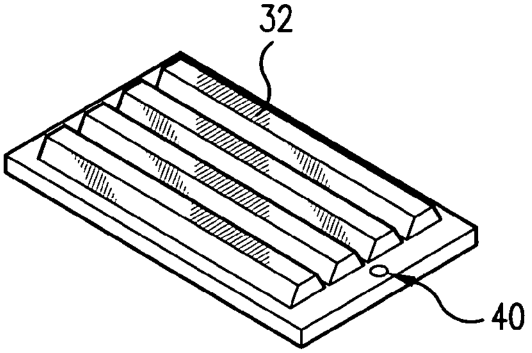
FIG. 4 depicts a perspective view of the preferred embodiment of the pick-up truck bed liner access panel.

FIG. 4 depicts a perspective view of the preferred embodiment of the pick-up truck bed liner access panel. The bed liner access panel 32 is rectangular and is approximately fourteen inches wide, twenty-six inches long and an inch thick in the preferred embodiment though a variety of sizes are possible. The bed liner access panel 32 is made of plastic though a variety of other materials may also be utilized. A repeating pattern of grooves is located on the bed liner access panel 32 and is designed to mimic the texture of a standard bed liner in the preferred embodiment. A hole 40 is located at the front center and the back center of the bed liner access panel 32 for insertion of an attaching mechanism.

Figure 5:
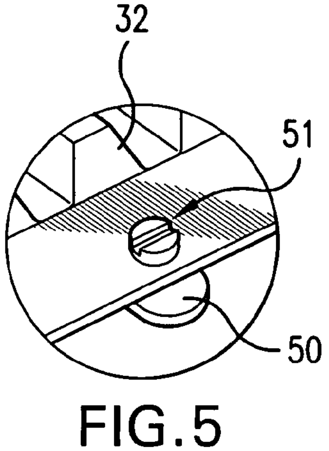
FIG. 5 depicts a close-up perspective view of the preferred embodiment of the attaching mechanism connected to the pick-up truck bed liner access panel.

FIG. 5 depicts a close-up perspective view of the preferred embodiment of the attaching mechanism connected to the pick-up truck bed liner access panel. A lobe 50 is present on a shaft (not pictured) that is connected to a slotted head 51 through one of the holes in the bed liner access panel 32. When the slotted head 51 is rotated, the shaft rotates the lobe 50 to latch the bed liner access panel 32 to the bed liner.

Other embodiments of the invention are for use with different types of motorized vehicles. The access panel may be located under car seats, in the floor of trunks or in other similar locations. Although the preferred embodiment is discussed in conjunction with a truck bed, the access panels described herein can be utilized on virtually any motorized vehicle, including trucks, cars and buses.

Still other embodiments of the access panel utilize a different number of screws and gaskets. For example, one version of the access panel utilizes a similar attaching mechanism to the one described in conjunction with the bed liner access panel as opposed to the set of six screws and six holes described in conjunction with FIG. 1.

To use the preferred embodiment of Fuel Pump Assembly Access Panel, an individual would install the access panel using the appropriate number of screws and the monolithic gasket. The access panel would cover an opening over the fuel tank and fuel pump area. When access to the fuel pump was required, the screws would be taken out, and the access panel would be removed. The necessary work would be performed, and the access panel would then simply be screwed back into place. Obviously, if a truck bed liner access panel was in place over the access panel of the present invention, it would be removed prior to removing the access panel.

The materials utilized for Fuel Pump Assembly Access Panel may vary widely but will likely include metals, plastic and rubber. The metals would ideally be selected from available steel or alloys of steel and aluminum. The production process related to the use of these metals insures that the metal is non-corrosive, durable and strong. The selected metal should have high impact strength and be capable of accepting and retaining coloring materials for an extended length of time.

The plastic used in the production will ideally be selected for durability and longevity. Thermoplastics are commonly used in the manufacturing of components similar to those used in this invention. Polyethylene, polypropylene, and other similar thermoplastic materials would be among those with the necessary traits. Members of this family are recognized universally as being versatile and of high quality.

The plastic components of Fuel Pump Assembly Access Panel can also be formed with the use of plastic molding techniques, such as injection molding or blow molding. Injection molding requires melted plastic to be forcefully injected into relatively cool molds. As the plastic begins to harden, it takes on the shape of the mold cavity. This technique is ideal for the mass production of products. Alternatively, blow molding, a form of extrusion, could be utilized. Blow molding involves a molten tube being pushed into a mold. Compressed air then forces the molten tube against the cold walls of the mold.

It should be obvious that the components of the present invention can be of various shapes and sizes. It should also be obvious that the components of the invention can be made of different types of metals, plastics or other suitable materials and can be of any color.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A device for use with a fuel pump assembly comprising:

(a) an access panel for covering an opening over a fuel pump of a vehicle;

(b) an attaching mechanism located on the access panel to secure the access panel to the vehicle; and (c) a bed liner access panel having a second attaching mechanism to securing said bed liner access panel to a bed liner of the vehicle; wherein the bed liner access panel has a repeating pattern of grooves; and wherein the second attaching mechanism is a first lobe connected to a first shaft with a first slotted head located on one end of the bed liner access panel and a second lobe connected to a second shaft with a second slotted head located on the opposite end of the bed liner access panel.

2. The device of claim 1 wherein the access panel is approximately twelve inches wide, twenty-four inches long and a sixteenth of an inch thick.

3. The device of claim 1 wherein the access panel is made of sheet metal.

4. The device of claim 1 wherein the attaching mechanism is a first screw hole containing a first screw located at the front and center of the access panel, a second screw hole containing a second screw located at the back and center of the access panel, a third screw hole containing a third screw and a fourth screw hole containing a fourth screw located on one side of the access panel and a fifth screw hole containing a fifth screw and a sixth screw hole containing a sixth screw hole located on the opposite side of the access panel from the third screw hole and the fourth screw hole.

5. The device of claim 4 further comprising a monolithic gasket dimensioned to fit around and under the perimeter of the access panel.

6. The device of claim 5 wherein the monolithic gasket has a plurality of holes.

7. The device of claim 5 wherein the monolithic gasket is made of rubber.

8. A device for use with a fuel pump assembly comprising:

(a) an access panel for covering an opening over a fuel pump of a vehicle;

(b) a first screw hole containing a first screw located at the front and center of the access panel, a second screw hole containing a second screw located at the back and center of the access panel, a third screw hole containing a third screw and fourth screw hole containing a fourth screw located on one side of the access panel and a fifth screw hole containing a fifth screw and a sixth screw hole containing a sixth screw located on the opposite side of the access panel from the third screw hole and the fourth screw hole;

(c) a monolithic gasket having a plurality of holes dimensioned to fit around and under the perimeter of the access panel; and (d) a bed liner access panel having a first lobe connected to a first shaft with a first slotted head located on one end and a second lobe connected to a second shaft with a second slotted head located on the opposite end.

* * * * *